US007594882B1

(12) United States Patent  (10) Patent No.: US 7,594,882 B1
Xiao  (45) Date of Patent: Sep. 29, 2009

(54) TOOL CHANGER FOR MACHINE TOOL

(76) Inventor: Alan Xiao, No. 12, Lane 63, Sec. 2, Liouchuan East Road, Taichung 40346 (TW)

( * ) Notice: Subject to any disclaimer, the term of this patent is extended or adjusted under 35 U.S.C. 154(b) by 0 days.

(21) Appl. No.: 12/154,257

(22) Filed: May 20, 2008

(51) Int. Cl.
  *B23Q 3/157* (2006.01)
(52) U.S. Cl. .................... 483/67; 483/59; 211/1.52; 211/70.6; 211/181.1
(58) Field of Classification Search .............. 483/67, 483/59, 66, 54, 55, 56, 902; 211/1.52, 70.6, 211/69, 70, 95, 106.01, 85.31, 163, 181.1
See application file for complete search history.

(56) References Cited

U.S. PATENT DOCUMENTS

| | | | | |
|---|---|---|---|---|
| 2,615,577 | A | * | 10/1952 | Bartleman ................. 211/70.6 |
| 3,602,370 | A | * | 8/1971 | Jerch et al. ................. 211/70.6 |
| 4,053,968 | A | * | 10/1977 | Johnson et al. .............. 483/56 |
| 4,858,980 | A | * | 8/1989 | Dreisig et al. ................ 483/67 |
| 5,102,177 | A | * | 4/1992 | Dreisig et al. ............... 483/902 |
| 5,672,145 | A | * | 9/1997 | Pollington et al. ............ 483/67 |
| 5,702,336 | A | * | 12/1997 | Kameyama .................. 483/59 |
| 6,102,840 | A | | 8/2000 | Xiao ............................. 483/67 |
| 6,515,472 | B2 | * | 2/2003 | Wurn et al. .............. 324/207.2 |
| 6,814,692 | B2 | * | 11/2004 | Mattes et al. ................. 483/49 |
| 7,341,549 | B2 | * | 3/2008 | Jung ............................ 483/59 |

FOREIGN PATENT DOCUMENTS

| | | | | |
|---|---|---|---|---|
| JP | 58-155141 | A | * | 9/1983 |
| JP | 01-289633 | A | * | 11/1989 |
| JP | 03-245939 | A | * | 11/1991 |

* cited by examiner

*Primary Examiner*—Erica A Cadugan
(74) *Attorney, Agent, or Firm*—Charles E. Baxley

(57) ABSTRACT

A tool changer for a machine tool includes a disc magazine having a plate, and a number of retainers attached to the outer peripheral portion of the plate for detachably supporting tool members, the retainers each include a base portion attached to the outer peripheral portion of the plate, and a holding device disposed on the base portion and having two arms for resiliently holding and carrying and supporting the tool member. The retainers each include a coupling portion coupled between two legs, the arms of the holding devices may be extended from the legs and may be formed from a longitudinal wire or rod member for reducing the weight of the retainers.

12 Claims, 7 Drawing Sheets

TOOL CHANGER FOR MACHINE TOOL

BACKGROUND OF THE INVENTION

1. Field of the Invention

The present invention relates to a tool changer, and more particularly to a tool changer for a machine tool including an improved structure for decreasing the weight of the tool changer and the machine tool and for allowing the tool changer to be easily rotated or driven by the motor driving device, and also for reducing the manufacturing cost for the machine tool, and also for allowing the tool changer to be easily and quickly formed and manufactured and to be easily and quickly assembled together.

2. Description of the Prior Art

Typical machine tools, particularly the programmable machine tools comprise a tool member rotated or driven by a motor driving device for machining various work pieces, and one or more disc magazines rotatably secured or disposed on a supporting base and having a number of notches formed in the peripheral portions of the disc magazines for supporting a number of spare tool members. The peripheral portions of the disc magazines comprise a number of ribs or flanges extended inward of the notches for engaging with the annular grooves of the tool members and for securing the tool members in place.

One of such typical tool changers is disclosed in U.S. Pat. No. 6,102,840 to Xiao, the present inventor, and comprise a disc magazine having a number of openings opened radially outward from the outer peripheral portion of the disc magazine for supporting a number of spare tool members, and a number of retainers and spring members attached to the disc magazine and engaged with the spare tool members for supporting and retaining the spare tool members to the disc magazine.

However, the disc magazine is made of an integral cast material and includes a great weight that may not be easily operated or rotated or driven by the motor driving device, or the motor driving device may spend or consume a great electric power or energy to operate or rotate or drive the tool members and the disc magazine.

In addition, the sizes or diameters of the openings formed in the outer peripheral portion of the disc magazine are predetermined or include the predetermined inner diameter which may not be changed or adjusted for receiving the tool members of different sizes or shapes or diameters.

The present invention has arisen to mitigate and/or obviate the afore-described disadvantages of the conventional tool changers for the machine tools.

SUMMARY OF THE INVENTION

The primary objective of the present invention is to provide a tool changer including an improved structure for decreasing the weight of the tool changer and the machine tool and for allowing the tool changer to be easily rotated or driven by the motor driving device, and also for reducing the manufacturing cost for the machine tool.

The other objective of the present invention is to provide a tool changer including an improved structure for allowing the tool changer to be easily and quickly formed and manufactured and to be easily and quickly assembled together.

In accordance with one aspect of the invention, there is provided a tool changer for a machine tool, the tool changer comprising a disc magazine including a plate having an outer peripheral portion, and a number of retainers attached to the outer peripheral portion of the plate for detachably receiving and supporting tool members respectively, and the retainers each include a base portion attached to the outer peripheral portion of the plate, and each include a holding device provided on the base portion, and the holding device each include two arms for resiliently holding and carrying and supporting the tool member.

The base portions of the retainers each include two legs, and a coupling portion coupled between the legs. The arms of the holding devices are preferably extended from the legs of the base portions of the retainers respectively.

The arms of the holding devices each include a curved holding member for engaging with the tool member. The curved holding members of each holding device form a circular structure for holding and grasping the tool member.

The tool members each include a shank portion having an annular groove for engaging with the curved holding members of the holding device. The disc magazine may include one or more boards secured to the plate.

The holding devices each include an outwardly extended guiding segment extended from each curved holding member for forming a widely opened entrance and for guiding the tool member to engage into the curved holding members of the holding devices.

The plate includes a number of openings formed in the outer peripheral portion of the plate and opened radially and outwardly therefrom for receiving the base portions of the retainers. The openings of the plate are preferably equally spaced from each other.

A housing is further provided and includes a chamber formed in the housing, a rail is disposed in the chamber of the housing for slidably attaching a carrier, a motor driving device is attached to the carrier and includes a spindle secured to the plate for rotating the plate and the retainers relative to the carrier.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
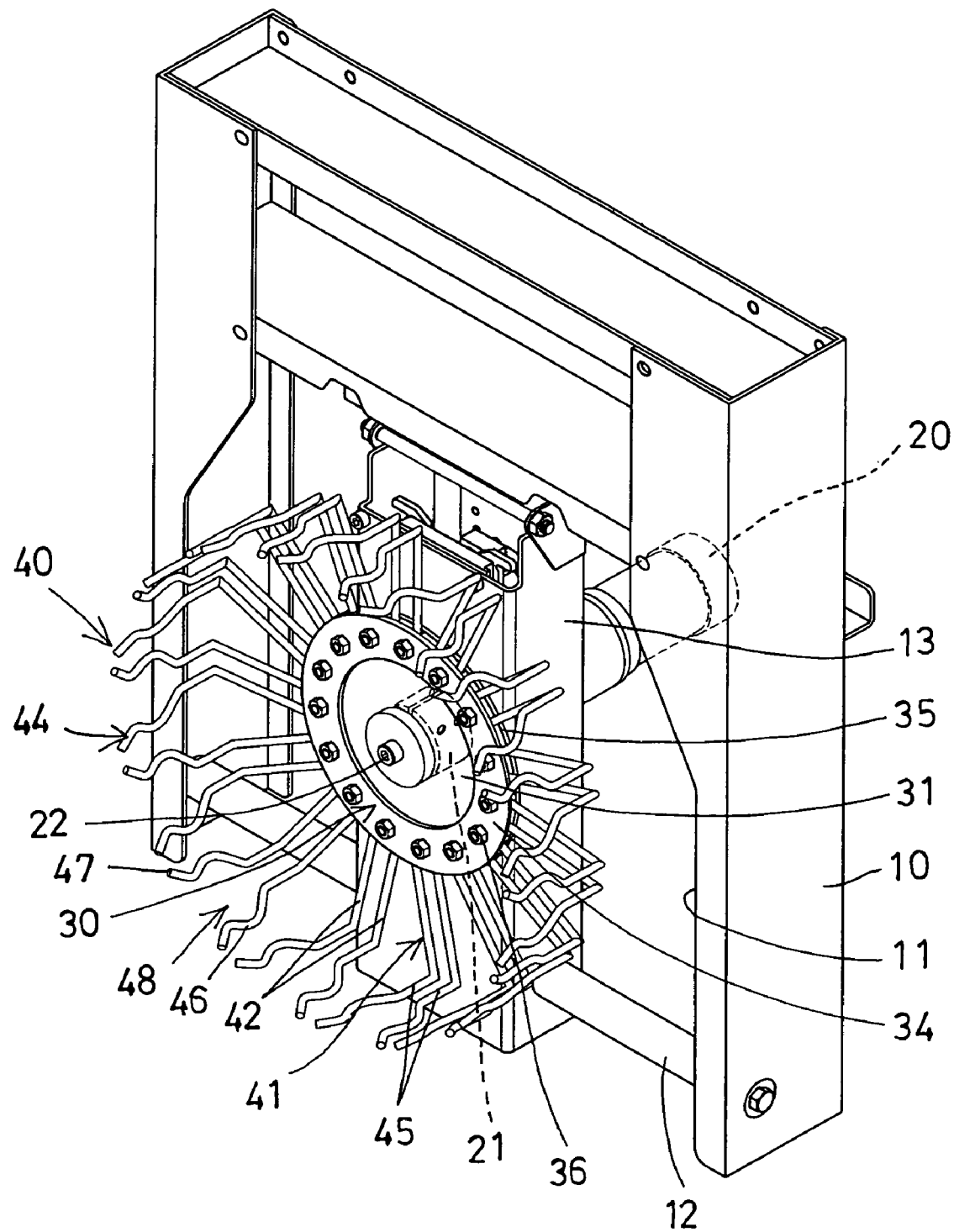
FIG. 1 is a perspective view of a tool changer for a machine tool in accordance with the present invention.
Figure 2:
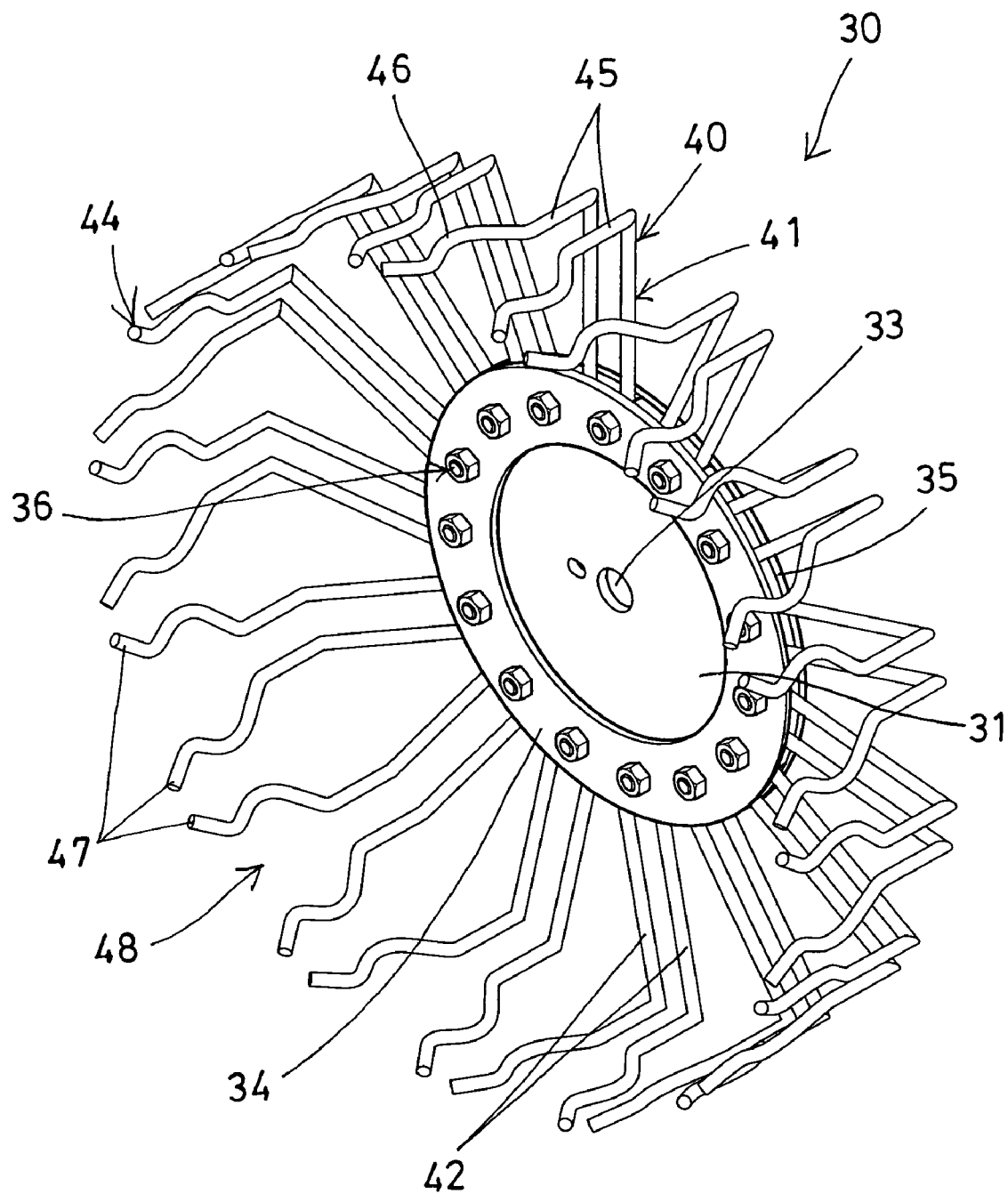
FIG. 2 is a perspective view of the tool changer for the machine tool.
Figure 3:
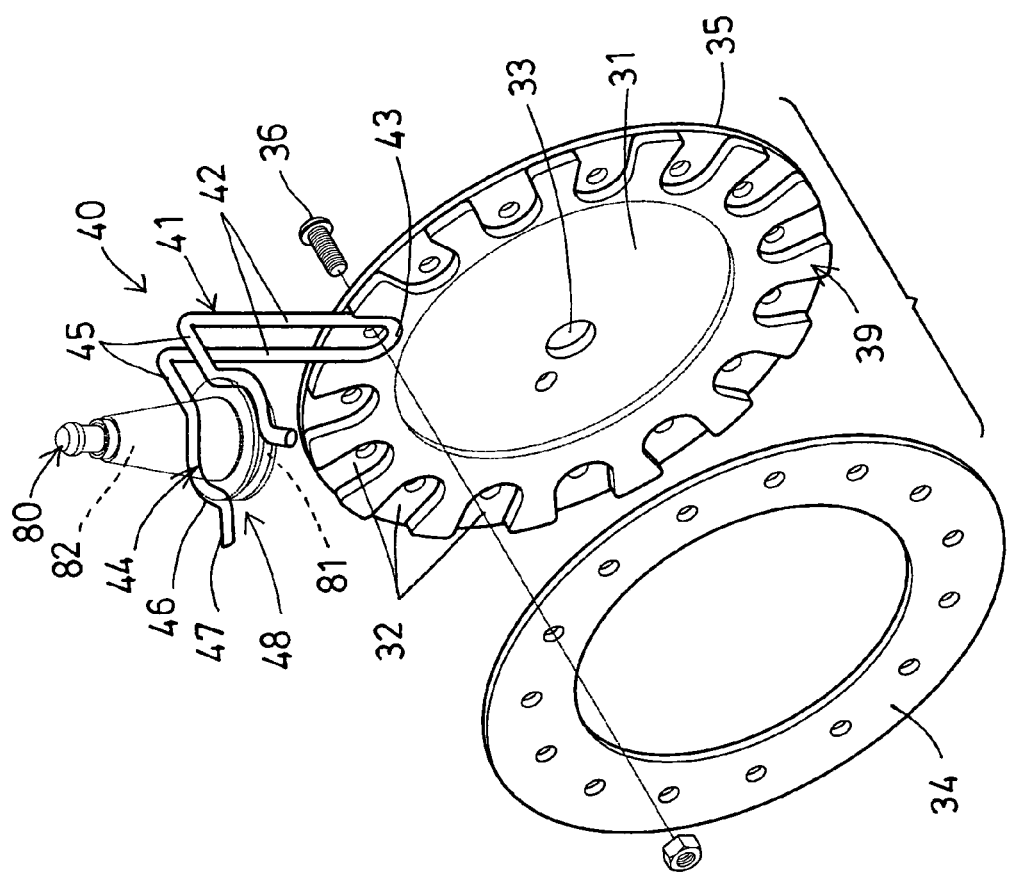
FIG. 3 is a partial exploded view of the tool changer for the machine tool.
Figure 4:
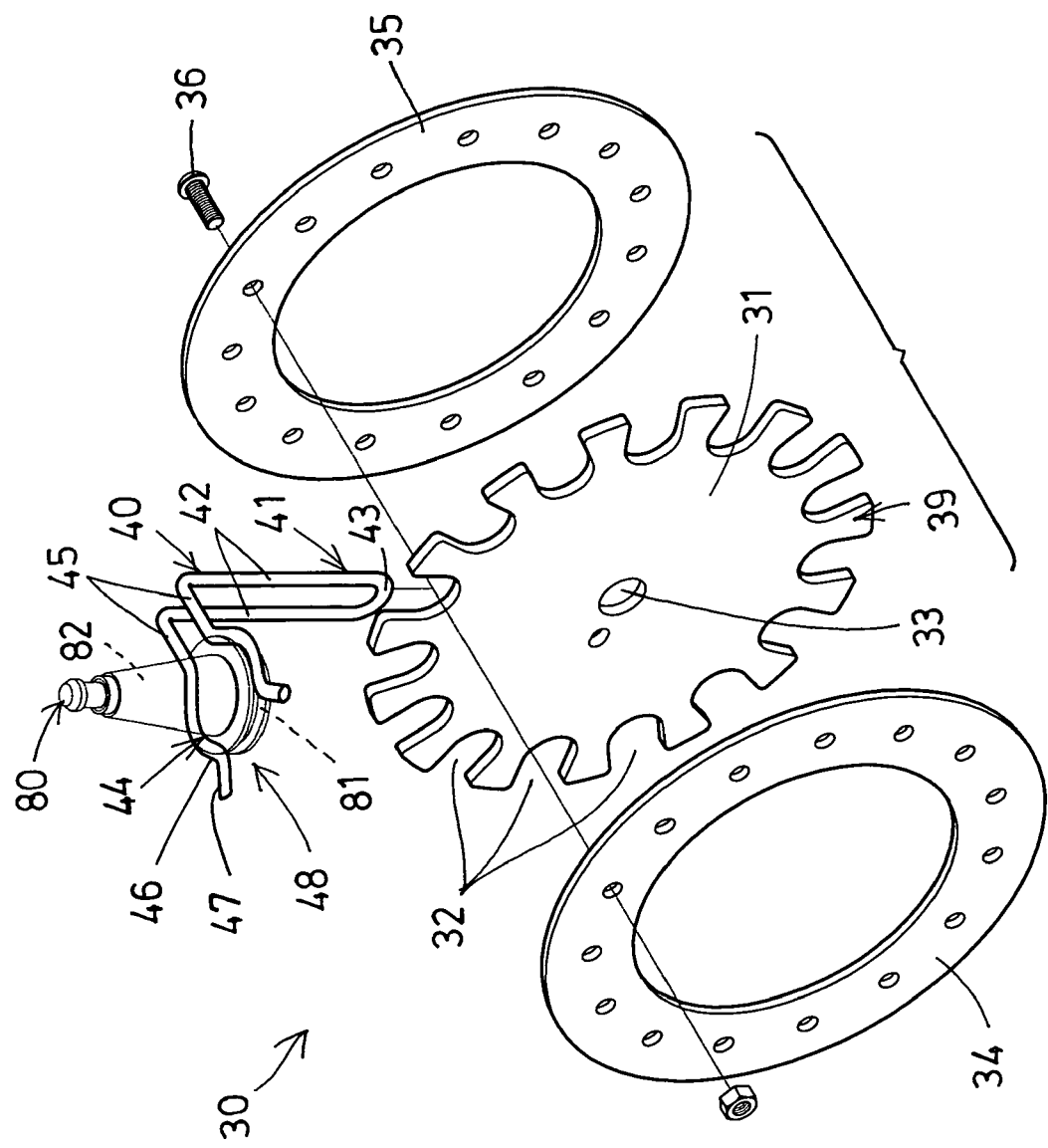
FIG. 4 is another partial exploded view of the tool changer for the machine tool.
Figure 5:
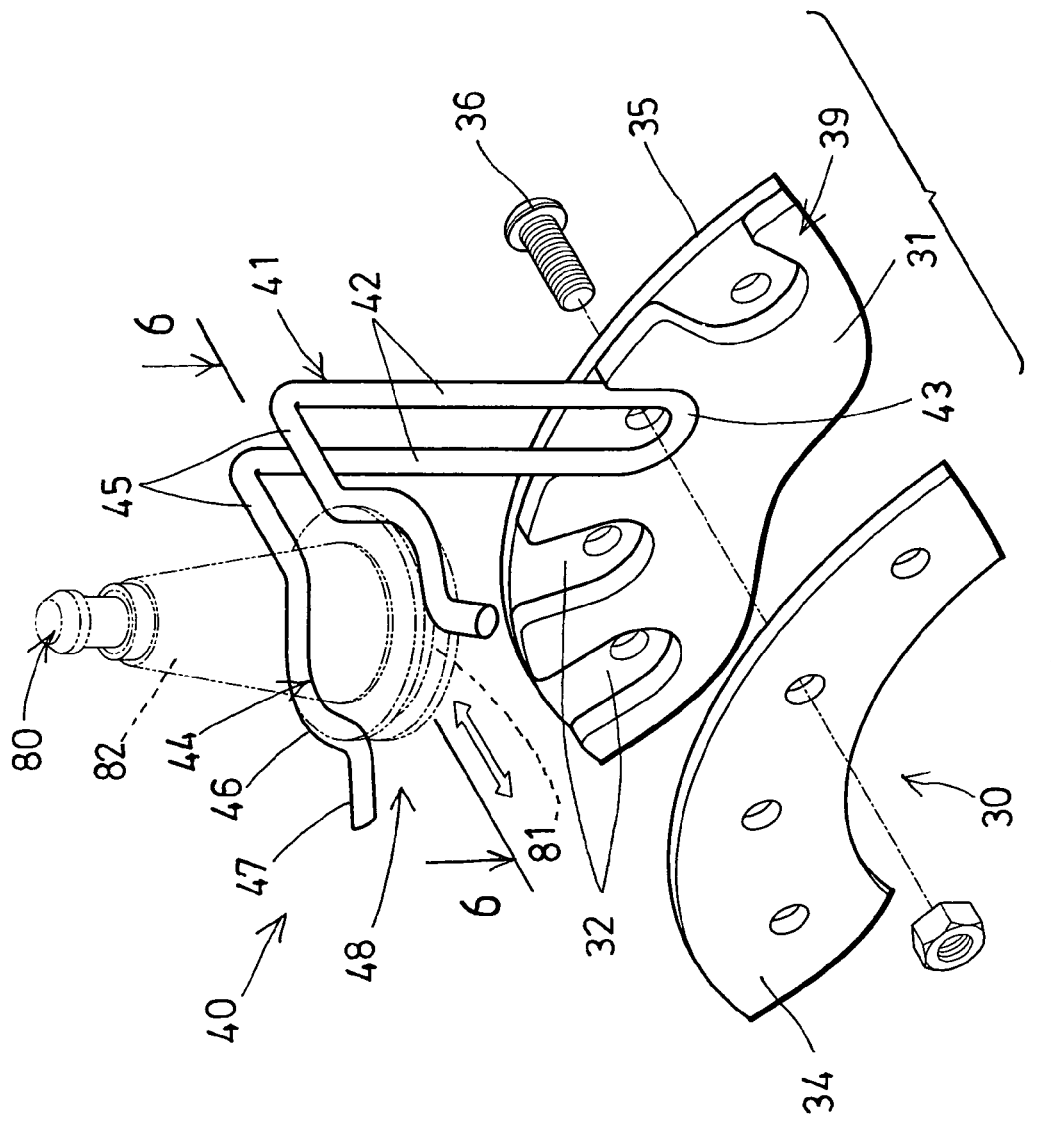
FIG. 5 is a further partial exploded view of the tool changer for the machine tool.
Figure 7:
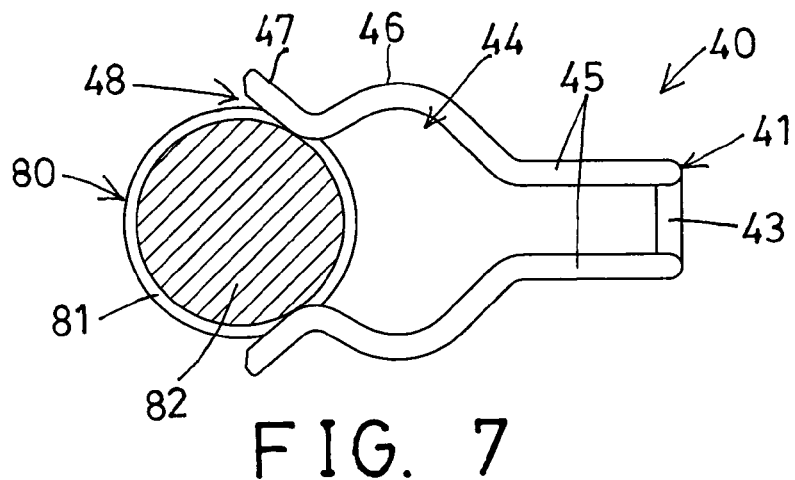
FIGS. 7, 8 are cross sectional views similar to FIG. 6, illustrating the operation of the tool changer.
Figure 8:
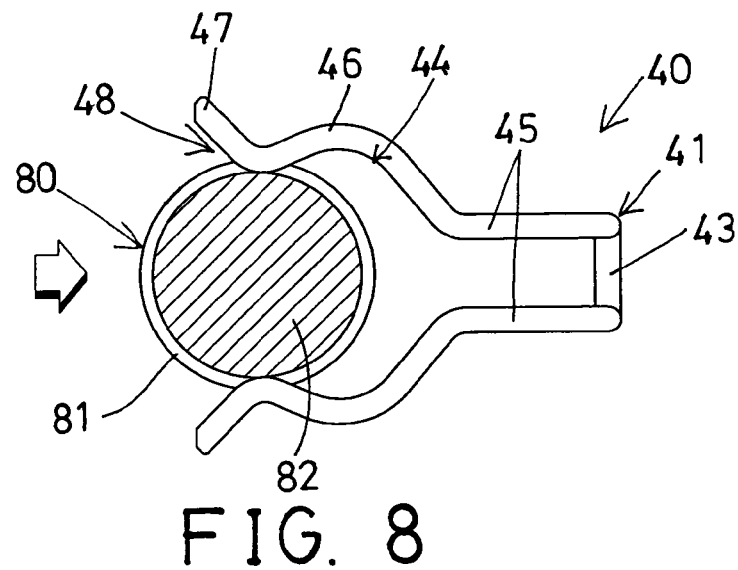
Figure 6:
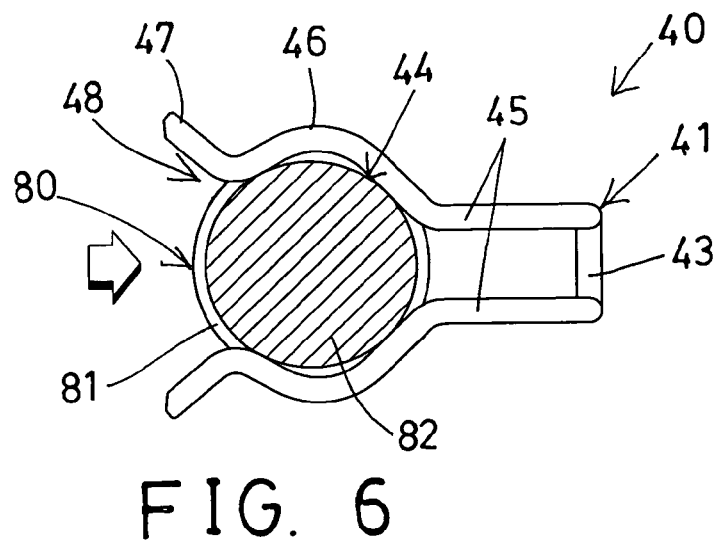
FIG. 6 is a cross sectional view of the tool changer taken along lines 6-6 of FIG. 5.

Referring to the drawings, and initially to FIG. 1, a tool changer in accordance with the present invention comprises a supporting base or frame or housing 10 for attaching to a machine tool (not shown), and including a chamber 11 formed in the housing 10, and including one or more tracks or rails 12 attached or disposed in the chamber 11 of the housing 10 for slidably attaching or supporting a follower or sliding member or carrier 13. A motor or motor driving device 20 is attached to the carrier 13 includes a spindle 21 extended in or out of the carrier 13 for attaching or supporting a disc magazine 30.

As shown in FIGS. 2-5, the disc magazine 30 of the tool changer includes a base or central plate 31 having a number of openings 32 formed in the outer peripheral portion 39 thereof and preferably equally spaced from each other, and opened radially and outwardly therefrom for attaching or receiving retainers 40 therein, and the retainers 40 are provided for detachably receiving or supporting tool members 80 respectively (FIGS. 3-8). The plate 31 includes a central hole 33 formed therein for attaching or securing to the spindle 21 of the motor driving device 20 with latches or fasteners 22 (FIGS. 1, 9) and for allowing the disc magazine 30 and the retainers 40 to be rotated or driven by the motor driving device 20.

The retainers 40 each include a U-shaped base portion 41 having two legs 42 and a coupling portion 43 coupled between the legs 42, and the coupling portions 43 of the retainers 40 are engaged into the openings 32 of the plate 31, and the legs 42 of the retainers 40 are extended out of the plate 31 and arranged for allowing the legs 42 to be moved toward or away from each other. Two boards 34, are disposed on two opposite sides of the plate 31 and secured to the plate 31 with latches or fasteners 36 which may solidly secure the boards 34, 35 and the plate 31 together and which may also solidly secure the retainers 40 to the outer peripheral portion 39 of the plate 31 and/or to the boards 34, 35 of the disc magazine 30.

Figure 9:
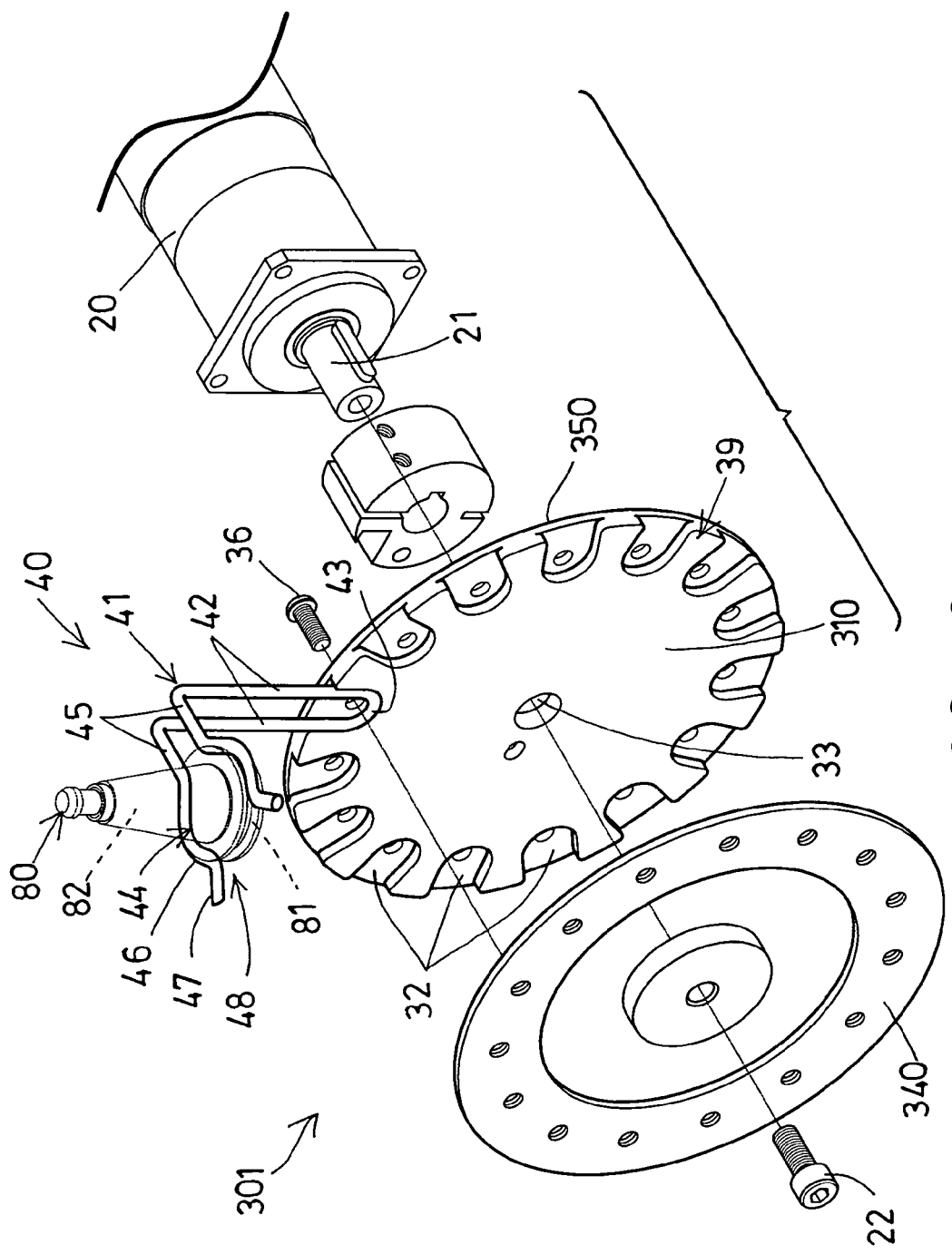
FIG. 9 is a further partial exploded view illustrating the other arrangement of the tool changer for the machine tool.

Alternatively, as shown in FIG. 9, the plate 310 and one of the boards 350 of the disc magazine 301 may be solidly secured or formed together with such as the molding or mold injection procedures for forming a solid structure, or the plate 310 and the other board 340 of the disc magazine 301 may be solidly secured or formed together with such as the molding or mold injection procedures. However, the securing of the plate 310 with the boards 340, 350 is not related to the present invention and will not be described in further details.

The retainers 40 each further include a holding device 44 formed or provided on one end portion or on top of the base portion 41, and the holding device 44 includes two arms 45 bent or extended from the legs 42 of the retainers 40 respectively, and preferably but not necessarily perpendicular to the legs 42 for holding or attaching or carrying or supporting the tool member 80, and the tool members 80, such as the cutting tools, each include an annular groove 81 formed in the shank portion 82 thereof, and the arms 45 of the holding devices 44 are provided for engaging with the annular grooves 81 of the tool members 80 and for detachably supporting or securing the tool members 80 respectively.

The arms 45 of the holding devices 44 each further include a C-shaped or curved holding member 46, and the two curved holding members 46 of each holding device 44 may be formed into a substantially circular structure for stably holding and grasping the shank portion 82 of the tool member 80, and the holding devices 44 each further include an outwardly extended guiding segment 47 bent or extended from each of the curved holding members 46 for forming a widely opened entrance 48 and for guiding the tool member 80 to engage into the curved holding members 46 of the holding devices 44 and for allowing the tool members 80 to be easily and quickly engaged into the curved holding members 46 of the holding devices 44.

It is to be noted that the arms 45 of the holding devices 44 may include a suitable resilience and may be suitably moved toward or away from each other for allowing the tool members 80 of different diameters to be suitably and resiliently clamped and grasped and retained between the curved holding members 46 of the arms 45 of the holding devices 44. The arms 45 and the legs 42 of the retainers 40 may be formed or bent from a single longitudinal wire or rod member for allowing the arms 45 and the legs 42 of the retainers 40 to include the suitable resilience and thus to suitably and resiliently clamp and grasp and retain the tool members 80 of different diameters between the curved holding members 46 of the arms 45 of the holding devices 44.

It is further to be noted that the arms 45 and the legs 42 formed or bent from the longitudinal wire or rod member may be easily and quickly formed by machines (not shown) in a mass production, such that the holding devices 44 and the retainers 40 may also be easily and quickly formed and manufactured such that the manufacturing cost for the disc magazine 30 may be greatly reduced. In addition, the arms 45 and the legs 42 of the holding devices 44 and the retainers 40 may also include a greatly reduced weight such that the disc magazine 30 may also be easily rotated or driven by the motor driving device 20. Furthermore, the tool members 80 may be easily and quickly engaged into or disengaged from the curved holding members 46 of the holding devices 44.

Accordingly, the tool changer in accordance with the present invention includes an improved structure for decreasing the weight of the tool changer and the machine tool and for allowing the tool changer to be easily rotated or driven by the motor driving device, and also for reducing the manufacturing cost for the machine tool, and for allowing the tool changer to be easily and quickly formed or produced and manufactured and to be easily and quickly assembled together.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool changer for a machine tool, said tool changer comprising:
   a disc magazine including a plate having an outer peripheral portion, and
   a plurality of retainers attached to said outer peripheral portion of said plate for detachably receiving and supporting tool members respectively, and
   said retainers each including a base portion attached to said outer peripheral portion of said plate, each base portion being in the form of a U-shape including two legs, and each retainer including a holding device provided on said base portion, and said holding device each including two arms for resiliently holding and carrying and supporting a respective one of said tool members therebetween, wherein a single wire or rod member is bent or formed to compose the base portion and two arms.

2. The tool changer as claimed in claim 1, wherein said legs extend out of the plate.

3. The tool changer as claimed in claim 1, wherein said base portions of said retainers each include a coupling portion coupled between said legs.

4. The tool changer as claimed in claim 1, wherein said arms of said holding devices are extended from said legs of said base portions of said retainers respectively.

5. The tool changer as claimed in claim 1, wherein said arms of said holding devices each include a curved holding member for engaging with said tool member.

6. The tool changer as claimed in claim 5, wherein said curved holding members of each holding device together form a circular structure for holding and grasping said tool member.

7. The tool changer as claimed in claim 5, wherein said tool members each include a shank portion having an annular groove for engaging with said curved holding members of said holding device.

8. The tool changer as claimed in claim 5, wherein said holding devices each include an outwardly extended guiding segment extended from each curved holding member for forming a widely opened entrance and for guiding said tool member to engage into said curved holding members of said holding devices.

9. The tool changer as claimed in claim 1, wherein said disc magazine includes at least one board secured to said plate.

10. The tool changer as claimed in claim 1, wherein said plate includes a plurality of openings formed in said outer peripheral portion of said plate and opened radially and outwardly therefrom for receiving said base portions of said retainers.

11. The tool changer as claimed in claim 10, wherein said openings of said plate are equally spaced from each other.

12. The tool changer as claimed in claim 1 further comprising a housing including a chamber formed in the housing, a rail disposed in said chamber of said housing for slidably attaching a carrier, a motor driving device attached to said carrier and including a spindle secured to said plate for rotating said plate and said retainers relative to said carrier.

* * * * *